United States Patent [19]
Dante

[11] Patent Number: 5,368,273
[45] Date of Patent: Nov. 29, 1994

[54] VENTURI METERING SYSTEM

[75] Inventor: Lucian J. Dante, Phoenix, Ariz.

[73] Assignee: Allied Signal Inc., Morris Township, Morris County, N.J.

[21] Appl. No.: 964,165

[22] Filed: Oct. 21, 1992

[51] Int. Cl.⁵ .......................... F16K 47/00; F02C 1/00
[52] U.S. Cl. .................... 251/122; 251/903; 60/734; 60/39.281
[58] Field of Search ............ 60/734, 39.281; 137/903; 251/205, 129.04, 903, 122, 375, 363

[56] References Cited

U.S. PATENT DOCUMENTS

| | | | |
|---|---|---|---|
| 3,521,853 | 7/1970 | Gillis, Jr. et al. | 251/122 |
| 3,648,460 | 3/1972 | Johnson et al. | 60/39.281 |
| 4,337,788 | 7/1982 | Seger | 251/122 |
| 4,413,646 | 11/1983 | Platt et al. | 251/122 |
| 4,424,666 | 1/1984 | Woody | 60/39.281 |
| 4,503,878 | 3/1985 | Taylor | 251/122 |
| 4,601,310 | 7/1986 | Phillips | 251/903 |
| 4,705,062 | 11/1987 | Baker | 251/903 |
| 4,707,278 | 11/1987 | Breyer et al. | 251/903 |
| 4,745,739 | 5/1988 | Bezard et al. | 60/39.281 |
| 4,926,629 | 5/1990 | Eick e al. | 60/39.281 |
| 5,161,777 | 11/1992 | Kawasaki et al. | 251/129.04 |

FOREIGN PATENT DOCUMENTS

| | | | |
|---|---|---|---|
| 1194074 | 11/1959 | France | 251/122 |
| 3240718 | 4/1984 | Germany | 251/122 |

*Primary Examiner*—Richard A. Bertsch
*Assistant Examiner*—Howard R. Richman
*Attorney, Agent, or Firm*—James W. McFarland; Robert A. Walsh

[57] ABSTRACT

A fuel flow delivery system for a gas turbine engine of simple, economical structure including a non-positive displacement centrifugal fuel pump delivering constant pressure, variable flow rate fuel flow through a venturi passage. A conical needle valve is variably positioned within the throat section of the venturi to variably meter fuel flow rate.

14 Claims, 2 Drawing Sheets

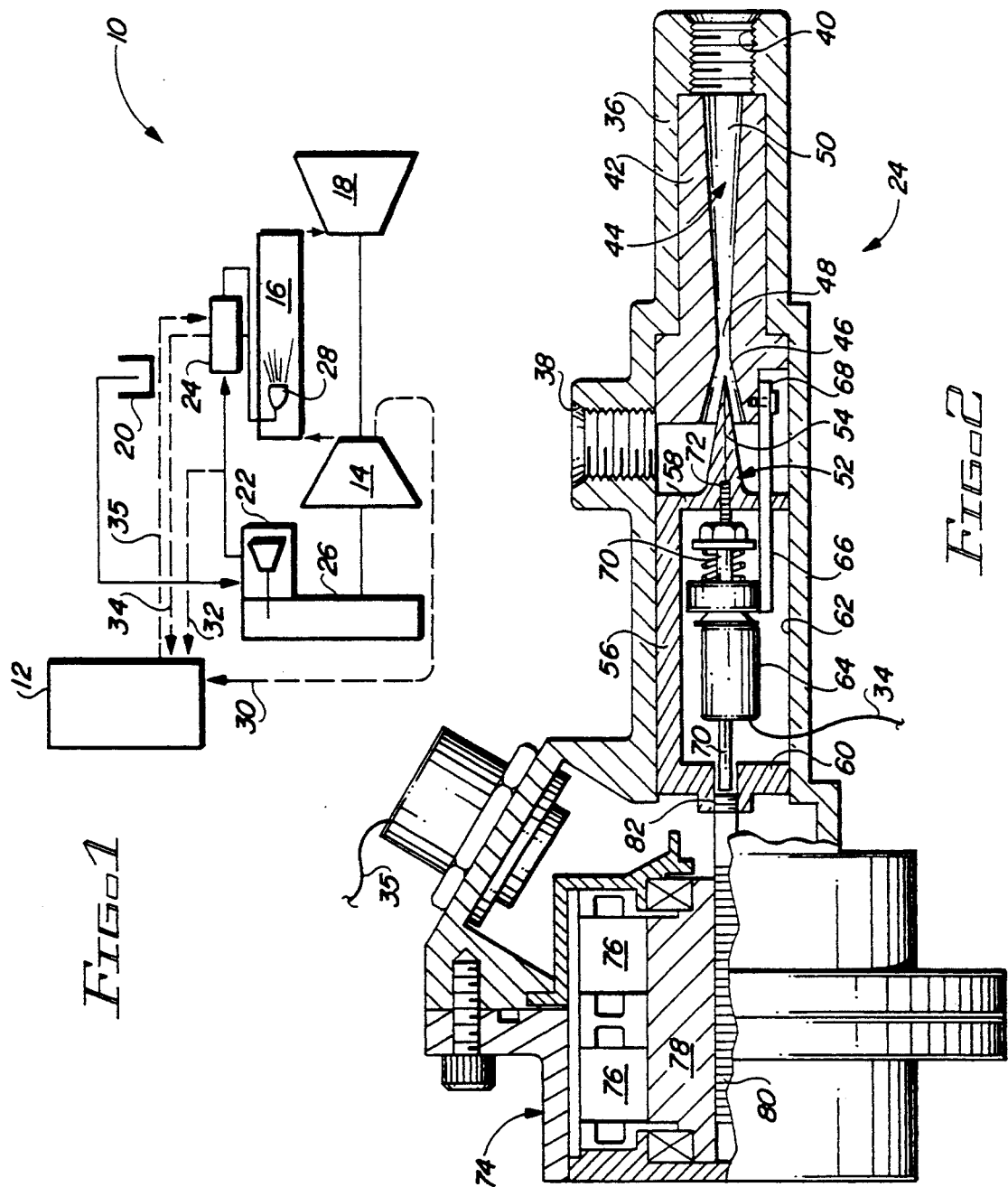

VENTURI METERING SYSTEM

TECHNICAL FIELD

This invention pertains to fuel delivery systems for gas turbine engines, and relates more particularly to an improved fuel metering system.

BACKGROUND OF THE INVENTION

Typically, hydromechanical and mechanical fuel metering systems for gas turbine engines are very complex and expensive. Such systems normally include a positive displacement fuel pump producing a variable pressure, fixed flow rate for a given pump speed. One proposal for a lower cost fuel supply system which does not utilize a positive displacement fuel pump is described in U.S. Pat. No. 4,926,629. As described in greater detail in this '629 patent which is incorporated herein by reference to the extend necessary for a full and complete understanding of the present invention, lower cost and simplified fuel metering systems can be associated with a non-positive displacement pump delivering fixed pressure, variable flow output for a given pump speed.

SUMMARY OF THE INVENTION

It is an important object of the present invention to provide an improved fuel metering system of the type to be utilized with non-positive displacement fuel pumps such as hydrodynamic pumps and centrifugal pumps which produce a fixed output pressure, variable flow rate output for a given pump speed.

More particularly, the present invention contemplates a fuel metering system wherein an elongated, conical needle valve is inserted into the throat of a venturi passage to vary the area of such passage and thereby meter fuel flow therethrough. Utilization of this arrangement allows significant recovery, up to 70 to 80 percent, of the pressure loss normally associated with a fuel metering system, while still producing accurate fuel metering at very low cost.

These and other objects and advantages of the present invention are specifically set forth in or will become apparent from the following derailed description of preferred forms of the invention, when read in conjunction with the accompanying drawings.

BRIEF DESCRIPTION OF THE DRAWINGS

FIG. 1 is a schematic representation of a gas turbine engine incorporating the present invention;

FIG. 2 is a partial cross-sectional plan view of a venturi metering valve as contemplated by the present invention;

DETAILED DESCRIPTION OF THE PREFERRED EMBODIMENTS

Figure 3:
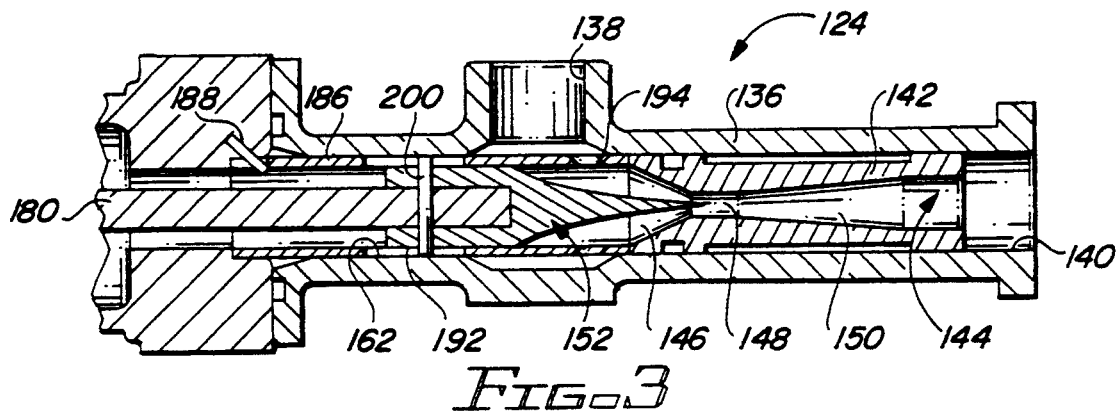
FIG. 3 is a partial cross-sectional plan view of an alternate configuration of a venturi metering valve as contemplated by the present invention.

FIG. 1 schematically illustrates a gas turbine engine 10 which has a full authority digital electronic fuel control 12, a compressor 14 delivering compressed air to a combustor 16, and a turbine 18 driven by gas flow from combustor 16 to perform useful work in conventional fashion. The gas turbine engine further includes a fuel supply system including a fuel tank or reservoir 20 delivering fuel to a nonpositive displacement, hydrodynamic centrifugal pump 22 which delivers pressurized fuel flow to a metering valve 24. Pump 22 is driven off the main rotating components of the gas turbine engine from a gearbox 26 to produce a substantially constant pressure output fuel flow to the metering valve 24, with the pressure of flow to the metering valve 24 being approximately proportional to the rotational speed of the centrifugal pump 22. Output flow rate from pump 22 varies dependent upon downstream loading. Metered fuel flow exiting the metering valve 24 is delivered to fuel nozzles 28 within the combustor 16 for support of the combustion process therein in conventional fashion. The full authority digital electronic control 12 receives an electrical signal schematically illustrated by the line 30 which is indicative of compressor discharge pressure, along with a signal schematically illustrated by the line 32 which is indicative of the pressure of inlet fuel flow delivered to the metering valve 24. Additionally, line 34 in FIG. 1 schematically illustrates the delivery to the control 12 of an electrical signal indicative of the position of the metering mechanism of metering valve 24. An output control signal, schematically illustrated by arrow 35, is transmitted to the metering valve 24 for adjusting the position of the metering mechanism therein. In conventional fashion the electronic control 12 processes these signals along with input command signals to adjust fuel flow to that commanded.

As shown in FIG. 2 the metering valve 24 includes a housing 36 having a fuel inlet 38 receiving pressurized fluid flow from the fuel pump, as well as a fuel outlet 40 from which metered fuel flow is delivered to the fuel nozzles of the combustor. Mounted within housing 36 is a venturi body 42 defining a venturi passage 44 therewithin. The venturi passage 44 has a converging entrance section 46, a minimum diameter throat section 48, and a diverging exit section 50. The converging section 46, throat section 48, and diverging section 50 are sequentially disposed between the inlet 38 and the outlet 40.

A pintle or needle valve 52 includes an elongated conical portion 54 axially aligned with and extending into the converging section 46 and throat section 48 of the venturi passage 44. Needle valve 52 further includes a tubular length 56 and first and second end walls 58, 60. Needle valve 52 is axially, reciprocally shiftable within a bore 62 in housing 36. A linear variable differential transformer 64 is located within needle valve 52 and is secured against axial motion through a bracket 66 extending through an opening in end wall 58 to a forward end 68 rigidly secured to the venturi body 42. Needle valve 52 is shiftable axially upon bracket 66, but bracket 66 prevents rotation of needle valve 52. The linear variable differential transformer 64 includes a central rod 70 extending therethrough with a threaded end 72 secured to needle valve end wall 58 to reciprocate therewith. Reciprocation of rod 70 within the stationary transformer 64 generates an electrical signal indicative of the position of needle valve 52.

The metering valve 24 further includes an electrical motor actuator generally denoted by the numeral 74. While a variety of electrical motors may be utilized, the motor illustrated comprises a pair of stepper motors 76 of conventional construction (two motors being included merely for purposes of redundancy). Each motor 76 may be energized to drive and rotate a central rotor 78 in opposite directions. Such stepper motor is particularly useful in transforming pulse-width-modulated digital signals into corresponding rotational movements of rotor 78. A central plunger 80 has a threaded portion in engagement with rotor 78 such that rotation of the rotor 78 causes corresponding axial shifting of plunger 80. One end 82 of the plunger 80 is rigidly affixed to end wall 60 of needle valve 52 such that the needle valve 52 reciprocates axially in response to the driving of stepper motor 76. As noted, the bracket 66 prevents rotation of needle valve 52 and thus the plunger 80 rigidly secured thereto.

In overall operation, pressurized fuel flow from the nonpositive displacement pump 22 is delivered into inlet 38 for passage sequentially through the converging, throat and diverging sections of the venturi passage for discharge through outlet 40. The digital control 12 generates a command signal as a result of processing the compressor discharge pressure signal 30, the fuel inlet pressure signal 32, the desired command signal, and the feedback signal 34 indicating the position of needle valve 52, and transmits this command signal 35 to the stepper motor 76. Rotor 78 and plunger 80 may thus driven reciprocally to accordingly move needle valve 52 rightwardly into the throat section 48 of the venturi passage 44 in order to restrict and reduce fuel flow. Similarly, a command signal to stepper motor 76 shifting the plunger 80 and needle valve 52 leftwardly will increase the area opening through the venturi passage to increase fuel flow to the combustor 16.

The preferred configuration of needle valve 52 and the venturi passage 44 cannot be discerned in FIG. 2 because of sizing; however, the preferred configuration for valve 52 and passage 44 are illustrated in the FIG. 3-6 arrangement, and the operation of the needle valve in efficiently, yet economically metering fuel flow is described below with respect to FIGS. 3-6.

In the FIG. 3-6 embodiment, elements corresponding to similar elements in FIG. 2 structure are denoted by reference numerals between 124 to 180 by the addition of 100 to the reference numerals of FIG. 2. Metering valve 124 includes a valve housing 136 having a central axial bore 162 extending therethrough. Housing 136 has a fuel inlet 138 extending perpendicularly to and intersecting the central axial bore 162, and an outlet 140 at one end of the bore 162. Rigidly affixed within bore 162 is a venturi body 142 having a venturi passage 144 extending axially therethrough. The venturi passage 144 includes a converging entrance section 146, a throat section 148 of minimum cross-sectional diameter, and a diverging exit section 150.

Figure 6:
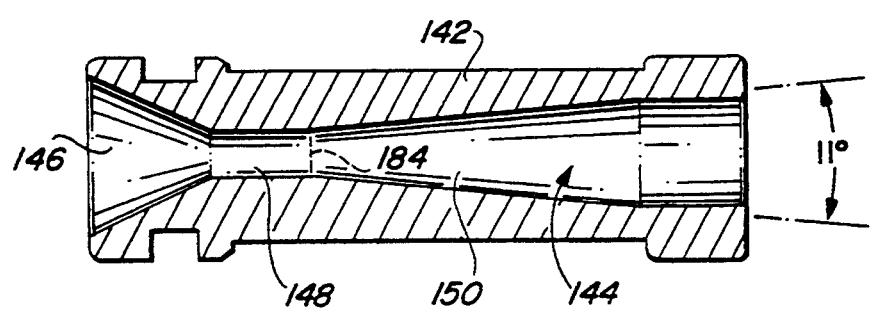
FIG. 6 is an enlarged cross-sectional plan view of the venturi body of the FIG. 3 embodiment.

As best illustrated in FIG. 6, the smaller diameter throat section 148 has its intersection with the downstream diverging section illustrated by the dashed line 184. While the entry converging section 146 has a relatively steep conical surface, the diverging section 150 has a very shallow conical surface defined by a conical surface of a revolution having an included angle of about 11 degrees. While in FIG. 6 the throat section 148 appears essentially of constant diameter, preferably the throat section 148 has a small convexity to provide a very smooth transition to the diverging section 150.

Figure 4:
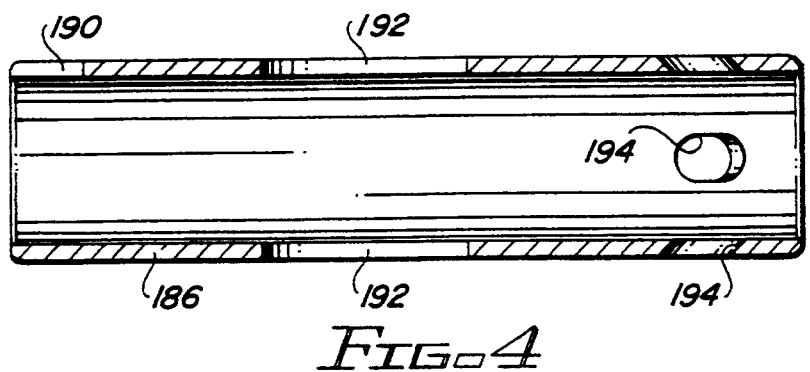
FIG. 4 is an enlarged cross-sectional plan view of the sleeve of the FIG. 3 embodiment.

The metering valve 124 of FIG. 3 also includes a sleeve 186 securely mounted at the wall defining bore 162, and restrained from rotation within bore 162 by a retainer pin 188 extending into an associated slot 190 at the leftward end of sleeve 186. As best shown in FIG. 4, the sleeve 186 also includes opposed slots 192 on opposite sides thereof, along with a plurality of angled openings 194 adjacent the entry converging portion 146 of the venturi passage 144. Angled openings 194 effectively redirect the incoming fuel flow from inlet 138 to a direction axially angled into the converging section 146 of the venturi passage.

Reciprocally mounted within the interior of sleeve 186 is a needle valve 152. The leftward end of needle valve 152 has a blind bore 196 and a cross bore 198 extending thereacross. Blind bore 196 receives plunger 180, and a cross-pin 00 extends through cross bores 198 and a corresponding bore in plunger 180 to rigidly secure the plunger 180 to needle valve 152. Slots 192 in the sleeve 186 receive opposite ends of cross pin 200 to secure both plunger 180 and needle valve 152 from rotation within bore 162.

Figure 5:
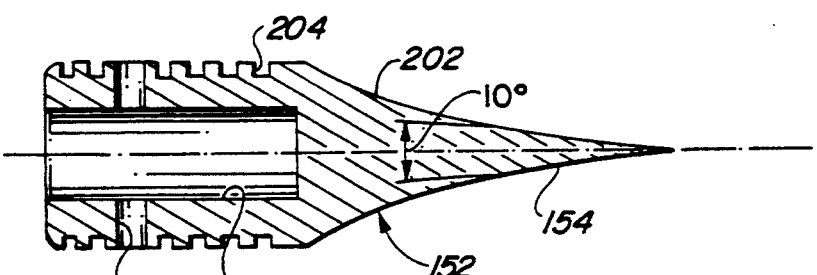
FIG. 5 is a cross-sectional enlarged plan view of the needle valve of the FIG. 3 embodiment.

As best depicted in FIG. 5, the pintle or needle valve 152 has a highly tapered conical end portion 154 defined by conical surface of revolution having a very low included angle of approximately 10 degrees. Leftwardly of the conical surface 154 the needle valve smoothly transitions into a circular arc section 202 to smoothly expand out to the maximum diameter of the needle valve 152. Needle valve 152 may also be provided with a plurality of fluid trapping grooves 204 which facilitate reciprocable motion of the needle valve 152 within the interior of sleeve 186, while presenting a highly tortuous path to reduce fluid leakage thereacross.

In operation of the FIG. 3-6 embodiment, pressurized fluid flow enters inlet 138 perpendicularly to bore 162 and is turned partially axially as it passes through the angle openings 194 to reach the converging entry section 146. The circular arc portion section 202 of needle valve 152 further assists in smoothly directing the pressurized fluid flow into the converging section 146. In this section 146 the fluid flow is reduced in velocity.

Aside from maximum flow condition, the conical end 154 of the needle valve 152 is positioned to extend through the converging section and into the throat section 148 of the venturi passage. Thus, a ring-like, annular cross-sectional area is created within the throat section to present the minimum area, maximum flow restriction for any given metering position of the needle valve 152. Fluid flowing through this annular cross-sectional area and the throat section 148 increases in velocity, with attendant drop in pressure therein until cavitation is reached.

As the fluid flow then sequentially enters the diverging section 150 of the venturi passage, the gradually expanding area provided thereby causes gradual reduction in the velocity of fluid flow and attendant increase and recovery of pressure thereof. The venturi passage, with the needle valve restrictor 152 allows restriction of the fluid flow for metering purposes, yet permits recovery of substantially all of the pressure of the fluid flow, that is up to 70 or 80% of the pressure head, to provide a highly efficient, simple and economical manner of metering the fluid flow being delivered to the combustor of the gas turbine engine.

As described previously, rightward movement of plunger 180 shifts the needle valve 152 farther into the throat section 148 of the venturi passage. Because of the conical configuration of portion 154, this reduces the cross-sectional area of the ring-like segment defining the minimum flow area though the venturi passage to further restrict fluid flow, yet still allows substantial pressure recovery in the downstream diverging section 150. Similarly, leftward movement of plunger 180 withdraws the conical section 154 further outwardly from the throat section 148 to increase the cross-sectional flow area and allow greater fluid flow therethrough.

When so acting in combination with the nonpositive displacement fuel pump, a highly simplified and efficient fuel control system such as illustrated in FIG. 1 may be utilized. It is important to again note in this respect that the hydrodynamic pump maintains a substantially constant output pressure, rather than the increasing pressure normally associated with a positive displacement pump when generating fluid flow across a reduced size orifice. Thus, as downstream conditions change, such as the change in position of needle valve 152, output flow rate automatically adjusts. Yet since pressure at inlet 138 remains substantially constant regardless of the position of needle valve 152, as afforded by the hydrodynamic pump, metered fluid flow will be substantially proportional to the axial position of needle valve 152. This allows a simplified negative feedback control loop utilizing the sensed actual position of plunger 180, in comparison to a desired commanded needle valve position as determined by the digital electronic control in response to other parameters and input signals. At the same time, however, such variable metering is accomplished without introduction of efficiency reducing orifices wherein the pressure drop thereacross increases dramatically with reduced area orifices. The venturi configuration of the passage further allows substantial recovery of the pressure drop encountered by the fluid flow passing through the throat section to yet further increase the hydraulic efficiency of the present metering system.

Various alterations and modifications to the foregoing will be apparent to those skilled in the art. Accordingly, the foregoing detailed description of preferred arrangements of the invention should be considered exemplary in nature and not as limiting to the scope and spirit of the invention as set forth in the appended claims.

Having described the invention with sufficient clarity that those skilled in the art may make and use it, what is claimed is:

1. A metering valve for metering fuel flow to a gas turbine engine, comprising:
    a valve housing having a fuel inlet, a fuel outlet and a venturi passage including a converging section, a throat section and a diverging section disposed sequentially between the inlet and outlet;
    a conically tapered needle valve movably mounted in the housing and extending into said throat section of the venturi passage, said needle valve, venturi passage and outlet axially aligned on a common axis extending generally perpendicular to said inlet;
    means for adjustably positioning said needle valve within said throat section to variably meter the fuel flow; and
    a sleeve between said inlet and said converging section of the venturi passage, said sleeve having angled openings therein for directing fuel flow axially toward said converging section.

2. A metering valve as set forth in claim 1, wherein said needle valve is conically tapered having a diameter reducing in the downstream direction relative to fuel flow in said venturi passage.

3. A metering valve as set forth in claim 2, wherein the included angle of the cone of revolution of said needle valve is approximately ten degrees.

4. A metering valve as set forth in claim 3, wherein said diverging section of the venturi passage is conically shaped having a diameter increasing in said downstream direction, the included angle of the cone of revolution of said diverging section being approximately the same as said cone of revolution of the needle valve.

5. A gas turbine engine fuel delivery system including a hydrodynamic pump for producing a flow of fuel, and a fuel metering valve comprising:
    a valve housing having an inlet for receiving said flow of fuel from the pump, an outlet for discharging said flow of fuel, and a venturi passage having a converging section, a throat section, and a diverging section located sequentially between the inlet and outlet;
    a movable, conically shaped elongate needle valve extending through said converging section and into said throat section of the venturi passage, said needle valve, venturi passage and outlet axially aligned on a common axis extending generally perpendicular to said inlet;
    means for adjustably positioning the needle valve within said throat section to variably meter fuel flow therethrough; and
    a sleeve between said inlet and said converging section of the venturi passage, said sleeve having angled openings therein for directing fuel flow axially toward said converging section.

6. A gas turbine engine fuel delivery system including a hydrodynamic pump for producing a flow of fuel, and a fuel metering valve comprising:
    a valve housing having an inlet for receiving said flow of fuel from the pump, an outlet for discharging said flow of fuel, and a venturi passage having a converging section, a throat section, and a diverging section located sequentially between the inlet and outlet;
    a movable, conically shaped elongate needle valve extending through said converging section and into said throat section of the venturi passage; and
    means for adjustably positioning the needle valve within said throat section to variably meter fuel flow therethrough, comprising a plunger secured to said needle valve and an electric motor responsible to a digital input signal to controllably, reciprocally drive said plunger;
    wherein said motor is a stepper motor selectively, rotatably drivable, said plunger being in threaded, driven engagement with said stepper motor.

7. A fuel delivery system as set forth in claim 6, further including means for sensing the position of said plunger, and feedback control means, responsive to said sensing means, for generating said digital input signal.

8. A gas turbine engine fuel delivery system including a hydrodynamic pump for producing a flow of fuel, and a fuel metering valve comprising:
    a valve housing having an inlet for receiving said flow of fuel from the pump, an outlet for discharging said flow of fuel, and a venturi passage having a converging section, a throat section, and a diverging section located sequentially between the inlet and outlet;

a movable, conically shaped elongate needle valve extending through said converging section and into said throat section of the venturi passage;

a plunger secured to said needle valve;

an electrical stepper motor responsive to a digital input signal to controllably, reciprocally drive said plunger;

means for sensing the position of said plunger; and feedback control means, responsive to said sensing means, for generating said digital input signal.

9. A fuel delivery system as set forth in claim 8, wherein said pump is a non-positive displacement, centrifugal pump.

10. A fuel delivery system as set forth in claim 8, wherein said needle valve is conically tapered having a diameter reducing in the downstream direction relative to fuel flow in said venturi passage.

11. A fuel delivery system as set forth in claim 10, wherein the included angle of the cone of revolution of said needle valve is approximately ten degrees.

12. A fuel delivery system as set forth in claim 11, wherein said diverging section of the venturi passage is conically shaped having a diameter increasing in said downstream direction, the included angle of the cone of revolution of said diverging section being approximately the same as said cone of revolution of the needle vale.

13. A fuel delivery system as set forth in claim 12, wherein said needle valve, said venturi passage and said outlet are axially aligned along a common axis.

14. A fuel delivery system as set forth in claim 13, wherein said inlet extends generally perpendicular to said common axis, and further including a sleeve between said inlet and said converging section of the venturi passage, said sleeve having angled openings therein for directing fuel flow axially toward said converging section.

* * * * *